United States Patent
Walker et al.

(10) Patent No.: US 9,234,912 B2
(45) Date of Patent: Jan. 12, 2016

(54) ATOMIC FAR-OFF RESONANCE TRAP (FORT) ACCELEROMETER SYSTEM

(71) Applicants: Thad G. Walker, Madison, WI (US); Michael S. Larsen, Woodland Hills, CA (US)

(72) Inventors: Thad G. Walker, Madison, WI (US); Michael S. Larsen, Woodland Hills, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 418 days.

(21) Appl. No.: 13/907,250

(22) Filed: May 31, 2013

(65) Prior Publication Data

US 2013/0327145 A1 Dec. 12, 2013

Related U.S. Application Data

(60) Provisional application No. 61/656,321, filed on Jun. 6, 2012.

(51) Int. Cl.
| | |
|---|---|
| H05H 3/02 | (2006.01) |
| H05H 3/04 | (2006.01) |
| G01P 15/00 | (2006.01) |
| G01P 15/093 | (2006.01) |
| G01P 15/18 | (2013.01) |

(52) U.S. Cl.
CPC ............. *G01P 15/006* (2013.01); *G01P 15/093* (2013.01); *G01P 15/18* (2013.01)

(58) Field of Classification Search
CPC .......... G01N 15/1459; G01N 15/1463; G01N 30/00; G21K 1/006; H05H 3/02; H05H 3/04
USPC ......................................... 250/251; 356/450
See application file for complete search history.

(56) References Cited

U.S. PATENT DOCUMENTS

| | | | | |
|---|---|---|---|---|
| 6,303,928 | B1 * | 10/2001 | Buell | B82Y 15/00 250/251 |
| 6,421,421 | B1 * | 7/2002 | McGeoch | H05G 2/003 250/251 |
| 6,744,038 | B2 * | 6/2004 | Wang | B07C 5/34 250/251 |
| 7,645,987 | B2 * | 1/2010 | Chang | H01J 49/0454 250/251 |
| 8,941,053 | B1 * | 1/2015 | Biedermann | G21K 1/006 250/251 |
| 9,086,429 | B1 * | 7/2015 | Biedermann | G01P 15/093 |
| 2003/0132749 | A1 * | 7/2003 | Speier | G01V 3/32 324/303 |
| 2008/0296483 | A1 * | 12/2008 | McClelland | H01J 27/24 250/251 |
| 2014/0374581 | A1 * | 12/2014 | Dionne | G21K 1/006 250/251 |

FOREIGN PATENT DOCUMENTS

| | | |
|---|---|---|
| EP | 2 104 406 A1 | 9/2009 |
| EP | 2 520 940 A1 | 11/2012 |
| WO | WO 2012/090134 A2 | 7/2012 |

* cited by examiner

*Primary Examiner* — David A Vanore
(74) *Attorney, Agent, or Firm* — Tarolli, Sundheim, Covell & Tummino LLP

(57) ABSTRACT

One embodiment includes an accelerometer system. The accelerometer system can include a Far-Off Resonance Trap (FORT) control system configured to generate an optical trapping beam. The system can also include a FORT accelerometer detection system including a FORT that is configured to trap a cluster of atoms based on the optical trapping beam. The FORT accelerometer detection system can also include an interrogation system configured to determine motion of the cluster of atoms along at least one axis resulting from an external acceleration in the at least one axis based on a relative phase shift of an optical probe beam through the cluster of atoms. The system can further include an acceleration processor configured to calculate the external acceleration in the at least one axis based on the relative phase shift of the optical probe beam.

20 Claims, 3 Drawing Sheets

ATOMIC FAR-OFF RESONANCE TRAP (FORT) ACCELEROMETER SYSTEM

RELATED APPLICATIONS

The present invention claims priority from U.S. Provisional Patent Application No. 61/656,321, entitled "ATOMIC FAR-OFF RESONANCE TRAP (FORT) ACCELEROMETER SYSTEM", filed Jun. 6, 2012, and which is incorporated herein by reference in its entirety.

TECHNICAL FIELD

The present invention relates generally to sensor circuits, and specifically to an atomic Far-Off Resonance Trap (FORT) accelerometer system.

BACKGROUND

Many types of instruments have been developed for measuring acceleration. One such example is a force-rebalanced accelerometer. For example, in a pendulous electrostatic force-rebalanced accelerometer, electrostatic forcing in a closed loop system is employed to position and obtain an output from a pendulous inertial mass or proof mass. The electrostatic forcing system may employ a capacitive pickoff electrode on each side of a pendulous member that has been etched from a silicon substrate. A control pulse can be employed to sequentially apply a constant amount of charge to each electrode. A variable force can be applied to the inertial mass by varying the amount of time (e.g., duty cycle) the charge is left on a respective plate. The amount of time the charge is left on a respective plate is based on the displacement of the inertial mass relative to a null position. However, electrostatic force-rebalanced accelerometers can be subject to a number of deleterious phenomena, such as accelerometer bias uncertainty which can be a major source of error in inertial measurement and/or navigation systems. Bias uncertainty can arise due to transient behavior at turn on, non-modelability, and instability of bias versus temperature characteristics including hysteresis and simply trend over time. In addition, pendulous electrostatic force-rebalanced accelerometers can be subject to damage from excessive input accelerations that can result in changes in the bias and scale-factor, which could require additional calibration of the accelerometer.

SUMMARY

One embodiment includes an accelerometer system. The accelerometer system can include a Far-Off Resonance Trap (FORT) control system configured to generate an optical trapping beam. The system can also include a FORT accelerometer detection system including a FORT that is configured to trap a cluster of atoms based on the optical trapping beam. The FORT accelerometer detection system can also include an interrogation system configured to determine motion of the cluster of atoms along at least one axis resulting from an external acceleration in the at least one axis based on a relative phase shift of an optical probe beam through the cluster of atoms. The system can further include an acceleration processor configured to calculate the external acceleration in the at least one axis based on the relative phase shift of the optical probe beam.

Another embodiment includes method for measuring acceleration in a FORT accelerometer system. The method includes generating an optical trapping beam and providing the optical trapping beam in a FORT to resonate the optical trapping beam in the FORT to trap a cluster of atoms at an approximate center of the FORT. The method also includes providing an optical probe beam through the approximate center of the FORT orthogonally with respect to a sensitive axis of the FORT accelerometer system. The method also includes monitoring a phase of the optical probe beam passing through the cluster of atoms. The method further includes calculating an external acceleration along the sensitive axis of the FORT accelerometer system based on a relative phase shift of an optical probe beam through the cluster of atoms resulting from motion of the cluster of atoms along the sensitive axis in response to the external acceleration.

Another embodiment includes an accelerometer system. The system includes a FORT control system configured to generate at least one optical trapping beam. The system also includes a FORT accelerometer detection system. The FORT accelerometer detection system includes a FORT configured to trap at least one cluster of alkali atoms based on the at least one optical trapping beam. The FORT accelerometer detection system also includes an interrogation system that includes a plurality of orthogonal optical cavities configured to resonate the at least one optical trapping beam in a respective plurality of orthogonal axes, and is configured to determine motion of the at least one cluster of alkali atoms in each of the plurality of orthogonal axes resulting from an external acceleration based on a relative phase shift of a respective plurality of optical probe beams resonating through the at least one cluster of alkali atoms. The system further includes an acceleration processor configured to calculate the external acceleration in the at least one axis based on the relative phase shift of the optical probe beam.

DETAILED DESCRIPTION

The present invention relates generally to sensor systems, and specifically to an atomic Far-Off Resonance Trap (FORT) accelerometer system. The FORT accelerometer system includes a FORT control system that is configured to generate an optical trapping beam that is provided to a FORT accelerometer detection system. The FORT accelerometer detection system includes a FORT configured to trap a cluster of atoms based on the optical trapping beam. For example, the FORT can include an optical resonator, such as a Fabry-Perot optical resonator, to trap the cluster of atoms based on red-detuning of the optical trapping beam. As an example, the optical trapping beam can be tuned at a specific intensity to adjust the sensitivity of the FORT accelerometer detection system. As another example, the FORT accelerometer detection system can include a plurality of FORTs, or can include a multi-axis FORT configured to trap a single cluster of atoms. Therefore, as described in greater detail herein, the FORT accelerometer system can be configured to detect acceleration vectors in any direction.

The FORT accelerometer detection system can also include an interrogation system configured to determine motion of the cluster of atoms in at least one direction resulting from an external acceleration. As described herein, "external acceleration" is defined as an acceleration of the accelerometer system resulting from an external force that is applied to the accelerometer system, and can include gravity as well as accelerations resulting from other external forces. The determination of motion can be based on a relative phase shift of an optical probe beam that is provided through the cluster of atoms. Therefore, as the cluster of atoms moves along a given axis in response to the external acceleration, the apparent index of refraction of the cluster of atoms changes, which thus changes the phase-shift of the optical probe beam as it propagates through the cluster of atoms and which is provided to an optical phase detection system. For example, the interrogation system can include an optical resonator configured to resonate the optical probe beam, such that the optical probe beam can experience detectable changes in phase as it passes through the cluster of atoms a large number of times.

Figure 1:
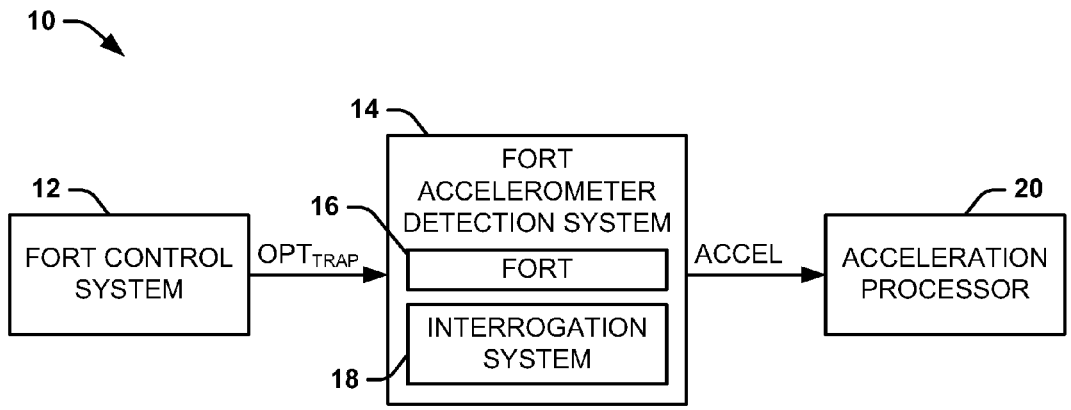
FIG. 1 illustrates an example of an accelerometer system.

FIG. 1 illustrates an example of an accelerometer system 10. The accelerometer system 10 can be implemented in any of a variety of applications, such as for navigation and/or guidance systems. Thus, the accelerometer system 10 can be configured to calculate an external acceleration acting upon the accelerometer system 10. As described herein, an external acceleration is defined as an acceleration of the accelerometer system 10 resulting from an external force that is applied to the accelerometer system 10, and can include gravity as well as accelerations resulting from other external forces.

The accelerometer system 10 includes a Far-Off Resonance Trap (FORT) control system 12 that is configured to generate an optical trapping beam $OPT_{TRAP}$. The optical trapping beam $OPT_{TRAP}$ can be a red or blue-detuned laser beam that is sufficient for trapping atoms in a FORT. As an example, the optical trapping beam $OPT_{TRAP}$ can have a sufficiently narrow beam-waist (e.g., approximately 5-100 µm) and sufficient power (e.g., several watts) for trapping a cluster of alkali atoms, such as rubidium (Rb). For example, a red-detuned optical trapping beam can have a cross-sectional intensity gradient that increases inward to a substantial maximum intensity at a cross-sectional center, and a blue-detuned optical trapping beam can have a cross-sectional intensity gradient that decreases inward to a substantial minimum intensity at a cross-sectional center. In addition, the FORT control system 12 can include intensity controls to tune the power of an associated laser that generates the optical trapping beam $OPT_{TRAP}$, as described in greater detail herein.

The optical trapping beam $OPT_{TRAP}$ is provided to a FORT accelerometer detection system 14. The FORT accelerometer detection system 14 includes a FORT 16 and an interrogation system 18. The FORT 16 can be configured as one or more optical resonators, such as Fabry-Perot optical resonator(s), configured to trap a cluster of atoms, such as Rb, based on a frequency of the optical trapping beam $OPT_{TRAP}$ being substantially off-resonance (e.g., red-detuned) from the atoms. Thus, the FORT 16 can trap the cluster of atoms with relatively greater forces in transverse axes with respect to resonation of the optical tapping beam $OPT_{TRAP}$ relative to a relatively lesser force in the longitudinal axis with respect to resonation of the optical tapping beam $OPT_{TRAP}$, with the magnitudes of the trapping forces being based on an intensity of the optical tapping beam $OPT_{TRAP}$. The cluster of atoms can have a gradient of refractive index values having a substantially greatest value in the approximate center of the cluster of atoms and decreasing in value in directions radially outward. Therefore, the interrogation system 18 can be configured to detect motion of the cluster of atoms resulting from an external force based on changes in refractive index perceived within the FORT 16.

The interrogation system 18 can also be configured to generate a signal ACCEL having a value that is based on the detected motion of the cluster of atoms. The signal ACCEL can be generated as a digital signal, for example, from an optical phase detection system that is configured to determine the apparent refractive index of the cluster of atoms based on an incident probe beam through the cluster of atoms at a given moment in time. As an example, the signal ACCEL can have a frequency that varies based on the index of refraction of the cluster of atoms. The signal ACCEL is provided to an acceleration processor 20 that is configured to calculate the magnitude of the external acceleration based on the value of the signal ACCEL. Therefore, the accelerometer system 10 can be configured to calculate a magnitude of external acceleration in at least one direction based on the acceleration processor 20.

Figure 2:
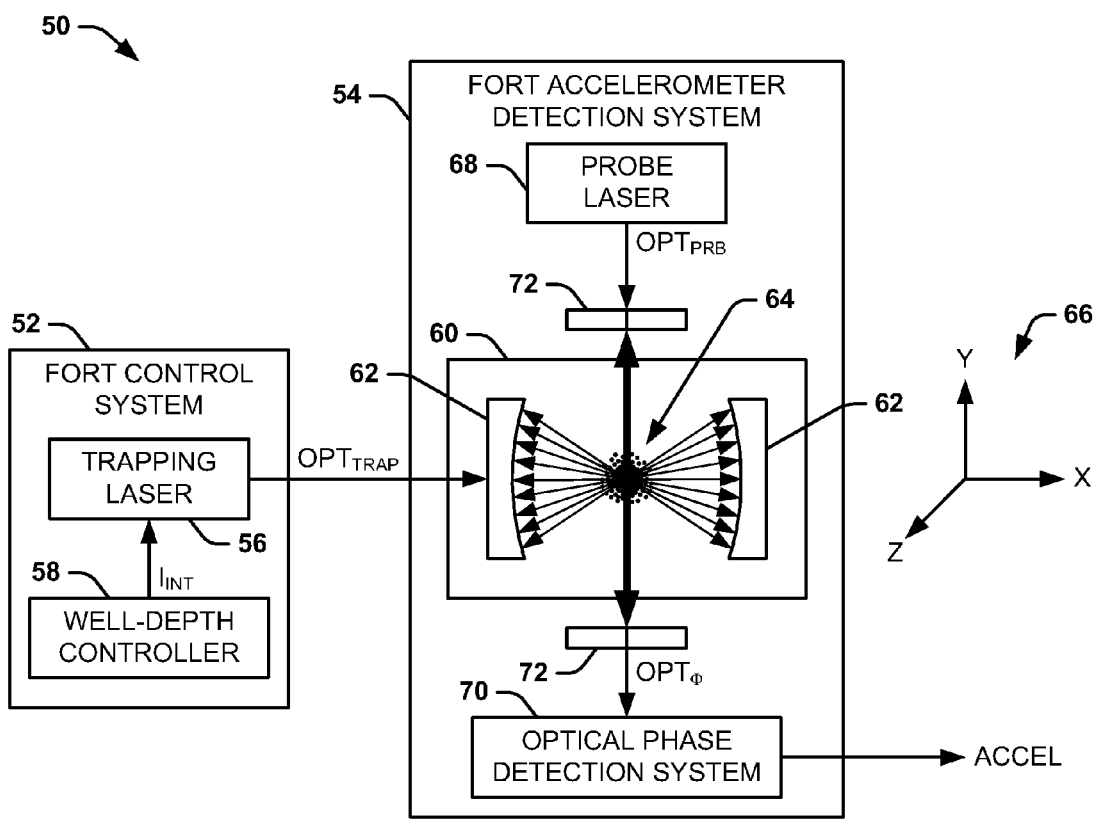
FIG. 2 illustrates another example of an accelerometer system.

FIG. 2 illustrates another example of an accelerometer system 50. As an example, the accelerometer system 50 can be configured as a portion of the accelerometer system 10 in the example of FIG. 1. The accelerometer system 50 includes a FORT control system 52 and a FORT accelerometer detection system 54.

The FORT control system 52 includes a trapping laser 56 and a potential well-depth controller 58. The trapping laser 56 is configured to generate the optical trapping beam $OPT_{TRAP}$ in response to a current $I_{INT}$. As an example, the optical trapping beam $OPT_{TRAP}$ can be a red or blue-detuned laser beam that is sufficient for trapping atoms in a FORT. As an example, the optical trapping beam $OPT_{TRAP}$ can have a sufficiently narrow beam-waist (e.g., approximately 5-100 µm) and sufficient power (e.g., several watts) for trapping a cluster of alkali atoms, such as Rb. The potential well-depth controller 58 can be configured to control the magnitude of the current $I_{INT}$, such that the intensity of the optical trapping beam $OPT_{TRAP}$ can be controlled based on the magnitude of the current $I_{INT}$. For example, as described in greater detail herein, the sensitivity of the accelerometer system 50 can be controlled based on the intensity of the optical trapping beam $OPT_{TRAP}$, and thus based on the magnitude of the current $I_{INT}$.

The optical trapping beam $OPT_{TRAP}$ is provided, such as via optics, to the FORT accelerometer detection system 54. The FORT accelerometer detection system 54 includes a FORT 60. The FORT 60 is demonstrated as including a Fabry-Perot optical resonator that includes a pair of oppositely disposed minors 62. In the example of FIG. 2, the minors 62 each have a concave interior surface. The FORT 60 is configured to resonate the optical trapping beam $OPT_{TRAP}$ between the mirrors 62 to trap a cluster of atoms 64, such as Rb, at a location that is approximately centered between the mirrors 62. The trapping of the cluster of atoms 64 can be based on a frequency of the optical trapping beam $OPT_{TRAP}$ being substantially off-resonance (e.g., red-detuned) of the atoms 64. Thus, the FORT 60 can trap the cluster of atoms with relatively greater forces in the Y- and Z-axes transverse to resonation of the optical tapping beam $OPT_{TRAP}$ relative to a relatively lesser force in the longitudinal X-axis, with reference to a Cartesian coordinate system 66.

The FORT accelerometer detection system 54 also includes a probe laser 68 and an optical phase detection system 70 that can collectively correspond to the interrogation system 18 in the example of FIG. 1. The probe laser 68 is configured to generate an optical probe beam $OPT_{PRB}$ that passes through the FORT 60 in a transverse direction (e.g., the Y-axis, in the example of FIG. 2), and thus through the cluster of atoms 64. As an example, the optical probe beam $OPT_{PRB}$ can pass through the cluster of atoms 64 in a slightly off-center manner to enable detection of motion of the cluster of atoms 64, as described herein, in both directions along the X-axis. In the example of FIG. 2, the optical probe beam $OPT_{PRB}$ resonates in an optical cavity formed from two oppositely disposed minors 72. For example, each of the minors 72 can be partially reflecting, such that the optical probe beam $OPT_{PRB}$ enters the optical cavity via a first mirror 72 and resonates a plurality of times before exiting the optical cavity through the opposite minor 72.

In the example of FIG. 2, the optical probe beam $OPT_{PRB}$ exits the optical cavity, and thus the FORT 60, as an optical signal $OPT_{\Phi}$ that is incident on the optical phase detection system 70. The optical signal $OPT_{\Phi}$ corresponds to the optical probe beam $OPT_{PRB}$ having a phase shift that corresponds to the motion of the cluster of atoms 64. In the example of FIG. 2, an external acceleration having a vector component in the X-axis can result in motion of the cluster of atoms 64 in an opposite direction along the X-axis. The cluster of atoms 64 can have a gradient of refractive index values having a substantially greatest value for light passing through the approximate center of the cluster of atoms 64 and decreasing in value in directions radially outward. Accordingly, the optical signal $OPT_{\Phi}$ can exhibit a phase-shift corresponding to the motion of the cluster of atoms 64. The amount of phase-shift can correspond to both the number of times that the optical probe beam $OPT_{PRB}$ resonates in the optical cavity formed by the minors 72 as well as the relative position of the cluster of atoms 64 with respect to the optical probe beam $OPT_{PRB}$. As described previously, the optical probe beam $OPT_{PRB}$ can resonate slightly off-center from the cluster of atoms 64 in the absence of acceleration. Therefore, an increase in phase-shift of the optical probe beam $OPT_{PRB}$ can indicate motion of the cluster of atoms 64 in one direction in the X-axis and a decrease in phase-shift of the optical probe beam $OPT_{PRB}$ can indicate motion of the cluster of atoms 64 in the opposite direction in the X-axis.

The optical phase detection system 70 is configured to generate a signal ACCEL having a value that is based on the detected motion of the cluster of atoms 64. The signal ACCEL can be generated as a digital signal, for example, such as having a frequency that varies based on the index of refraction of the cluster of atoms 64. The signal ACCEL can thus be provided to an acceleration processor, such as the acceleration processor 20 in the example of FIG. 1, that is configured to calculate the magnitude of the vector component of the external acceleration along the X-axis based on the value of the signal ACCEL.

As described previously, the sensitivity of the accelerometer system 50 can be controlled based on the intensity of the optical trapping beam $OPT_{TRAP}$, and thus based on the magnitude of the current $I_{INT}$. For example, the trapping force of the optical trap beam $OPT_{TRAP}$ resonating in the FORT 60 via the mirrors 62 can be based on the intensity of the optical trapping beam $OPT_{TRAP}$, which is controlled by the current $I_{INT}$. Therefore, the FORT 60 can be tuned based on the magnitude of the current $I_{INT}$ to affect both the sensitivity of the accelerometer system 50 and the trapping of the cluster of atoms 64. For example, by decreasing the current $I_{INT}$, and thus the intensity of the optical trapping beam $OPT_{TRAP}$, the cluster of atoms 64 can be more responsive to the external acceleration, and thus have a greater phase-shift of the optical probe beam $OPT_{PRB}$ as perceived by the optical phase detection system 70. As an example, the acceleration processor, such as the acceleration processor 20 in the example of FIG. 1, can be calibrated for variations of the intensity of the optical trapping beam $OPT_{TRAP}$. However, based on the decreased trapping force of the optical trapping beam $OPT_{TRAP}$, the FORT 60 can have a decreased maximum external acceleration corresponding to a loss of atoms 64 from the FORT 60. Accordingly, the current $I_{INT}$ can be dynamically controlled during operation of the accelerometer system 50 via the potential well-depth controller 58, such as to balance between sensitivity and extreme dynamic motion of the accelerometer system 50.

The accelerometer system 50 can thus calculate the magnitude of the external acceleration based on the phase shift of the optical probe beam $OPT_{PRB}$. Accordingly, the accelerometer system 50 can be substantially immune to damage resulting from excessive acceleration inputs that can result in changes in the bias and scale-factor requiring additional calibration of the accelerometer, as can be the case with pendulous electrostatic force-rebalanced accelerometer systems. In addition, the accelerometer system 50 can calculate substantially greater magnitudes of external acceleration than typical accelerometers (e.g., accelerations of approximately 1000 G).

The example of FIG. 2 demonstrates an accelerometer system that can calculate the external acceleration along a single axis. However, the principles of operation described in the example of FIG. 2 can be expanded for calculation of an external acceleration in two or more orthogonal axes.

Figure 3:
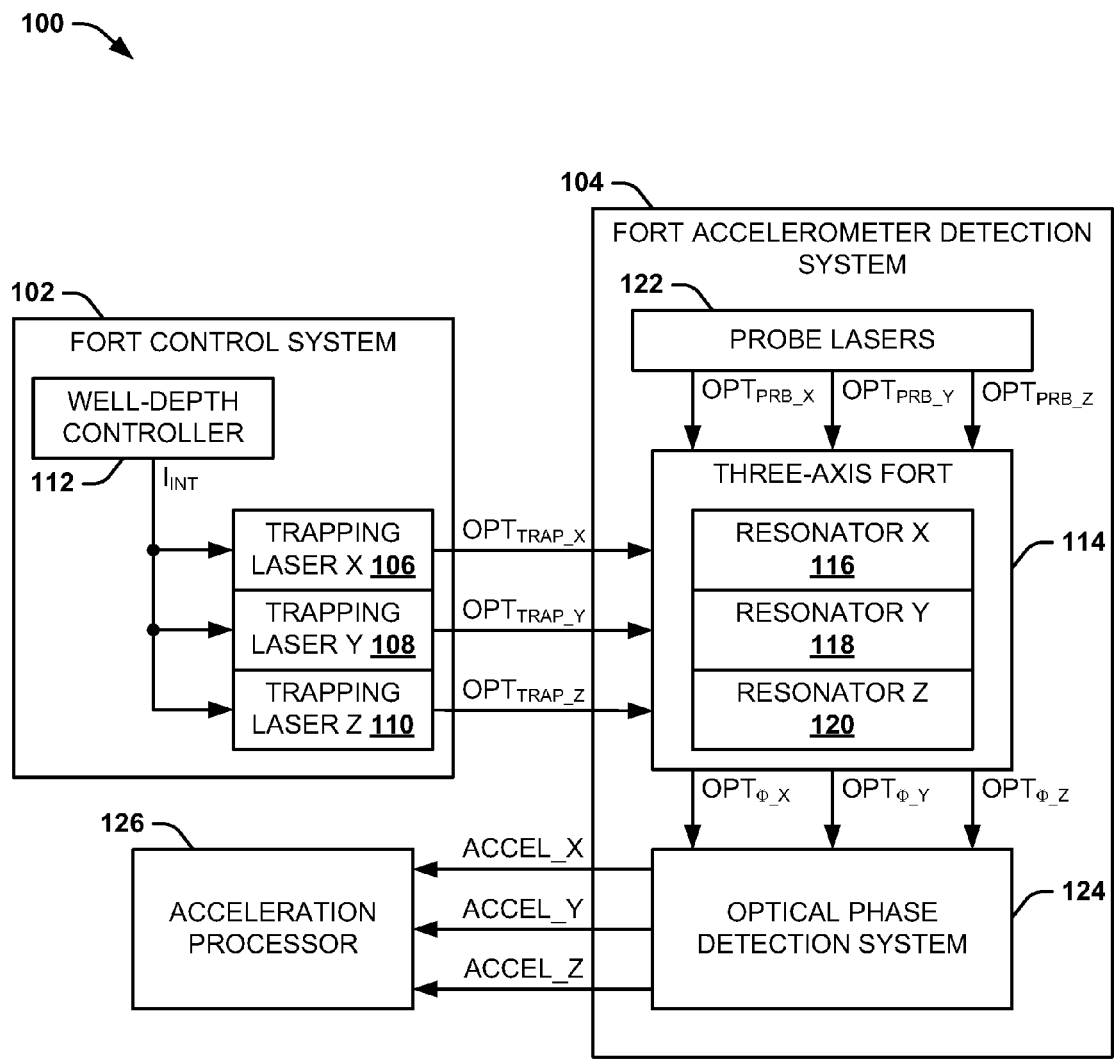
FIG. 3 illustrates an example of a three-axis accelerometer system.

FIG. 3 illustrates an example of a three-axis accelerometer system 100. The three-axis accelerometer system 100 can be implemented in any of a variety of applications, such as for navigation and/or guidance systems. Thus, the three-axis accelerometer system 100 can be configured to calculate an external acceleration acting upon the three-axis accelerometer system 100 in three orthogonal axes in Cartesian coordinate space.

The three-axis accelerometer system 100 includes a FORT control system 102 and a FORT accelerometer detection system 104. The FORT control system 102 includes a first trapping laser 106, a second trapping laser 108, and a third trapping laser 110 that are each configured to generate an optical trapping beam in each of three orthogonal axes X, Y, and Z, respectively. In the example of FIG. 3, the optical trapping beams are demonstrated as $OPT_{TRAP\_X}$, $OPT_{TRAP\_Y}$, and $OPT_{TRAP\_Z}$. As an example, the optical trapping beams $OPT_{TRAP\_X}$, $OPT_{TRAP\_Y}$, and $OPT_{TRAP\_Z}$ can each be red or blue-detuned laser beams that are sufficient for trapping atoms in a FORT, similar to as described previously. The FORT control system 102 also includes a potential well-depth controller 112 configured to generate a current $I_{INT}$ that is provided to each of the trapping lasers 106, 108, and 110. The intensity of the optical trapping beams $OPT_{TRAP\_X}$, $OPT_{TRAP\_Y}$, and $OPT_{TRAP\_Z}$ can be controlled based on the magnitude of the current $I_{INT}$, such that each of the optical trapping beams $OPT_{TRAP\_X}$, $OPT_{TRAP\_Y}$, and $OPT_{TRAP\_Z}$ have approximately equal intensities. It is to be understood that, while the FORT control system 102 is demonstrated as including separate trapping lasers 106, 108, and 110, it is to be understood that the FORT control system 102 could instead include a single trapping laser that is configured to generate a single optical trapping beam $OPT_{TRAP}$ that is split into the three orthogonal axes, such as via optics.

The optical trapping beams $OPT_{TRAP\_X}$, $OPT_{TRAP\_Y}$, and $OPT_{TRAP\_Z}$ are provided, such as via optics, to the FORT accelerometer detection system 104. The FORT accelerometer detection system 104 includes a three-axis FORT 114. The three-axis FORT 114 includes a first optical resonator 116, a second optical resonator 118, and a third optical resonator 120 that are configured to resonate the respective optical trapping beams $OPT_{TRAP\_X}$, $OPT_{TRAP\_Y}$, and $OPT_{TRAP\_Z}$ in the three respective orthogonal axes. For example, each of the optical resonators 116, 118, and 120 can be configured as Fabry-Perot optical resonators, such as having concave interior surfaces. As an example, the optical resonators 116, 118, and 120 can each be configured to trap a respective cluster of atoms, such that the FORT accelerometer detection system 104 can be configured to detect motion of each of the cluster of atoms in each of three respective orthogonal axes. As another example, the optical resonators 116, 118, and 120 can overlap at approximate centers to collectively trap a single cluster of atoms, such that the FORT accelerometer detection system 104 can be configured to detect motion of the cluster of atoms in each of the three respective orthogonal axes.

The FORT accelerometer detection system 104 also includes probe lasers 122 and an optical phase detection system 124 that can correspond to the interrogation system 18 in the example of FIG. 1. As an example, the probe lasers 122 can be separate lasers, or can correspond to a single laser that is split into three orthogonal beams via optics. The probe lasers 122 are configured to generate optical probe beams $OPT_{PRB\_X}$, $OPT_{PRB\_Y}$, and $OPT_{PRB\_Z}$ that pass through the three-axis FORT 114 in transverse directions of each of the three respective optical resonators 116, 118, and 120. Thus, the optical probe beams $OPT_{PRB\_X}$, $OPT_{PRB\_Y}$, and $OPT_{PRB\_Z}$ can each pass through respective clusters of atoms or through a single cluster of atoms. As an example, the optical probe beams $OPT_{PRB\_X}$, $OPT_{PRB\_Y}$, and $OPT_{PRB\_Z}$ can each pass through separate respective clusters of atoms in a slightly off-center manner to enable detection of motion of the respective clusters of atoms in both directions along the respective orthogonal axes. As another example, the optical probe beams $OPT_{PRB\_X}$, $OPT_{PRB\_Y}$, and $OPT_{PRB\_Z}$ can each pass through an approximate center of a single cluster of atoms. In addition, similar to as described previously in the example of FIG. 2, the optical probe beams $OPT_{PRB\_X}$, $OPT_{PRB\_Y}$, and $OPT_{PRB\_Z}$ can resonate in respective optical cavities a plurality of times before exiting the respective optical cavities.

In the example of FIG. 2, the optical probe beams $OPT_{PRB\_X}$, $OPT_{PRB\_Y}$, and $OPT_{PRB\_Z}$ each exit the respective optical cavities, and thus the three-axis FORT 114, as respective optical signals $OPT_{\Phi\_X}$, $OPT_{\Phi\_Y}$, and $OPT_{\Phi\_Z}$ that are incident on the optical phase detection system 124. The optical signals $OPT_{\Phi\_X}$, $OPT_{\Phi\_Y}$, and $OPT_{\Phi\_Z}$ correspond to the respective optical probe beams $OPT_{PRB\_X}$, $OPT_{PRB\_Y}$, and $OPT_{PRB\_Z}$ having phase shifts that correspond to the motion of the respective cluster(s) of atoms, similar to as described previously in the example of FIG. 2, in each of the three orthogonal axes. The amount of phase-shift of the optical probe beams $OPT_{PRB\_X}$, $OPT_{PRB\_Y}$, and $OPT_{PRB\_Z}$ can correspond to the relative position of the cluster(s) of atoms with respect to the respective optical probe beams $OPT_{PRB\_X}$, $OPT_{PRB\_Y}$, and $OPT_{PRB\_Z}$. As an example, for the three-axis FORT 114 including a single cluster of atoms, the difference in phase-shifts of the respective optical probe beams $OPT_{PRB\_X}$, $OPT_{PRB\_Y}$, and $OPT_{PRB\_Z}$ can indicate motion of the cluster of atoms in three-dimensions. As another example, for the three-axis FORT 114 including separate respective clusters of atoms, the phase-shifts of the respective optical probe beams $OPT_{PRB\_X}$, $OPT_{PRB\_Y}$, and $OPT_{PRB\_Z}$ can each indicate motion of the respective clusters of atoms in each of the three orthogonal axes.

As described previously, the sensitivity of the three-axis accelerometer system 100 can be controlled based on the intensities of the optical trapping beams $OPT_{TRAP\_X}$, $OPT_{TRAP\_Y}$, and $OPT_{TRAP\_Z}$, and thus based on the magnitude of the current $I_{INT}$. Because the current $I_{INT}$ is provided to all three of the trapping lasers 106, 108, and 110, the optical trapping beams $OPT_{TRAP\_X}$, $OPT_{TRAP\_Y}$, and $OPT_{TRAP\_Z}$ can all exhibit an approximately equal trapping force on the cluster(s) of atoms in the respective optical resonators 116, 118, and 120. Therefore, the motion of the cluster(s) of atoms can be approximately equal for approximately equal vector components of the external acceleration in the three orthogonal axes. Therefore, similar to as described previously in the example of FIG. 2, the current $I_{INT}$ can be dynamically controlled during operation of the three-axis accelerometer system 100 via the potential well-depth controller 112, such as to balance between sensitivity and extreme dynamic motion of the three-axis accelerometer system 100. Additionally, it is to be understood that the current $I_{INT}$ can be provided at a different magnitude to separately control the intensities of the optical trapping beams $OPT_{TRAP\_X}$, $OPT_{TRAP\_Y}$, and $OPT_{TRAP\_Z}$, such as for the three-axis FORT 114 that includes three separate clusters of atoms.

The optical phase detection system 124 is configured to generate respective signals ACCEL_X, ACCEL_Y, and ACCEL_Z having values that are based on the detected motion of the cluster(s) of atoms. The signals ACCEL_X, ACCEL_Y, and ACCEL_Z can be generated as digital signals, for example, such as having frequencies that vary based on the index of refraction of the cluster(s) of atoms. The signals ACCEL_X, ACCEL_Y, and ACCEL_Z are thus being provided to an acceleration processor 126 that is configured to calculate the magnitude of the external acceleration in each of the three orthogonal axes based on the values of the signals ACCEL_X, ACCEL_Y, and ACCEL_Z. Therefore, the three-axis accelerometer system 100 is configured to calculate the magnitude of an external acceleration in three dimensions. It is to be understood that, while the example of FIG. 3 demonstrates a three-axis accelerometer system, the principles described herein can be applicable to a two-axis accelerometer system that is configured to calculate the magnitude of an external acceleration in two dimensions, such that external acceleration is calculated in two of three orthogonal axes.

Figure 4:
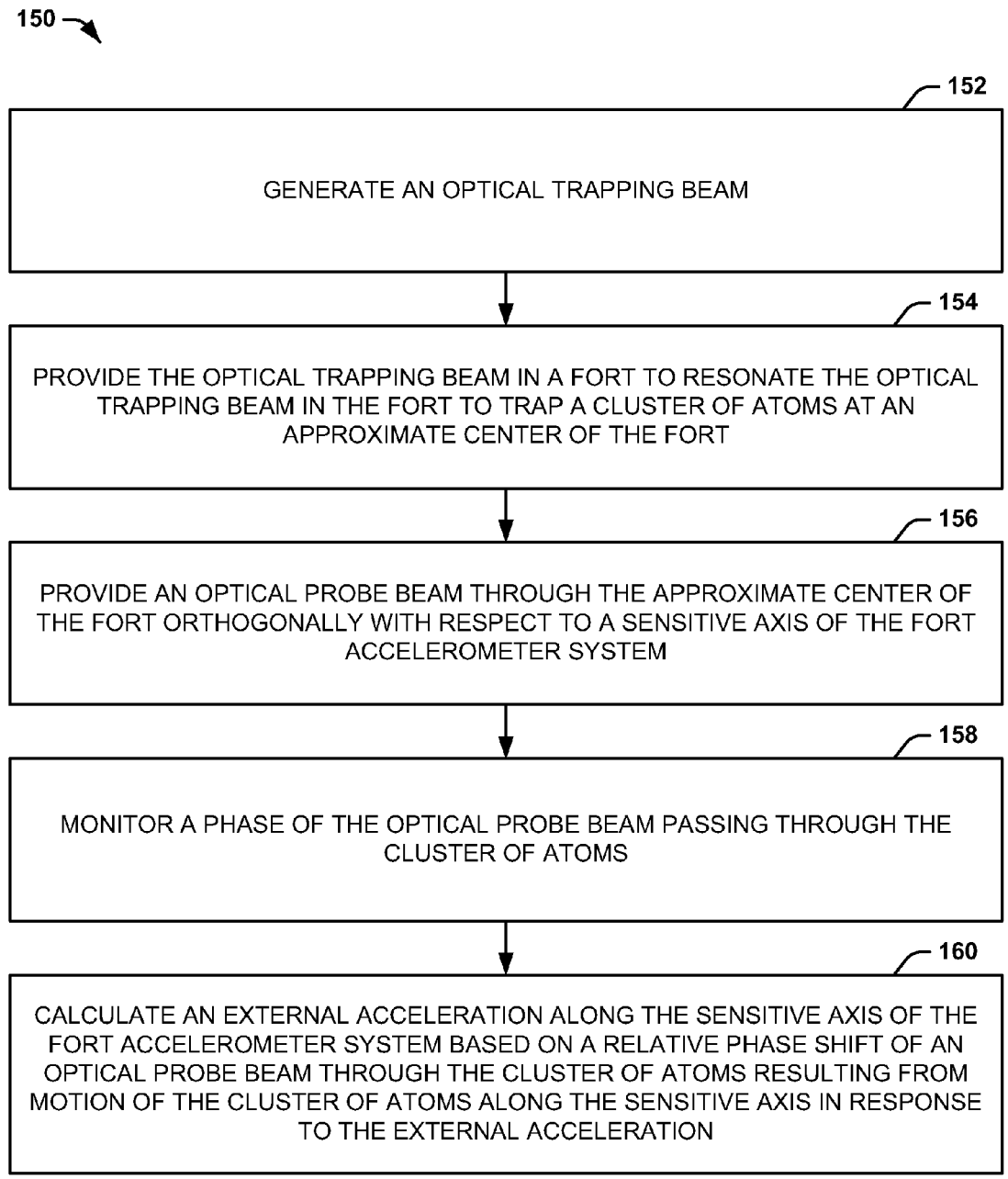
FIG. 4 illustrates an example of a method for measuring an external acceleration.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 150 for measuring an external acceleration in a FORT accelerometer system (e.g., the FORT accelerometer system 10). At 152, an optical trapping beam (e.g., the optical trapping beam $OPT_{TRAP}$) is generated. At 154, the optical trapping beam is provided in a FORT (e.g., the FORT 60) to resonate the optical trapping beam in the FORT to trap a cluster of atoms (e.g., the cluster of atoms 64) at an approximate center of the FORT. At 156, an optical probe beam (e.g., the optical probe beam $OPT_{PRB}$) is provided through the approximate center of the FORT orthogonally with respect to a sensitive axis (e.g., the X-axis of FIG. 2) of the FORT accelerometer. At 158, a phase of the optical probe beam passing through the cluster of atoms is monitored. At 160, an external acceleration along the sensitive axis of the FORT accelerometer system is calculated based on a relative phase shift of an optical probe beam through the cluster of atoms resulting from motion of the cluster of atoms along the sensitive axis in response to the external acceleration.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An accelerometer system comprising:
   a Far-Off Resonance Trap (FORT) control system configured to generate an optical trapping beam;
   a FORT accelerometer detection system comprising a FORT that is configured to trap a cluster of atoms based on the optical trapping beam, and also comprising an interrogation system configured to determine motion of the cluster of atoms along at least one axis resulting from an external acceleration in the at least one axis based on a relative phase shift of an optical probe beam through the cluster of atoms; and
   an acceleration processor configured to calculate the external acceleration in the at least one axis based on the relative phase shift of the optical probe beam.

2. The system of claim 1, wherein the FORT accelerometer detection system comprises a plurality of resonator cavities, such that the acceleration processor is configured to calculate the external acceleration in a plurality of orthogonal axes.

3. The system of claim 2, wherein the plurality of resonator cavities are each arranged orthogonal with respect to each other and are each configured to trap a respective one of a plurality of clusters of atoms, such that the interrogation system is configured to determine motion of each of the plurality of clusters of atoms in separate respective orthogonal axes based on a relative phase shift of a respective plurality of optical probe beams through the respective pluralities of clusters of atoms.

4. The system of claim 2, wherein the plurality of resonator cavities are arranged as a three-axis resonator cavity configured to trap the cluster of atoms based on three respective orthogonal trapping beams, such that the interrogation system is configured to determine motion of the cluster of atoms resulting from the external acceleration in three orthogonal axes based on a relative phase shift of three orthogonal optical probe beams through the cluster of atoms.

5. The system of claim 4, wherein the three orthogonal trapping beams are provided as having approximately equal energy to trap the cluster of atoms with approximately equal force in each of the three-orthogonal axes.

6. The system of claim 1, wherein the FORT control system comprises a potential well-depth controller configured to control an intensity of the optical trapping beam to adjust a magnitude of a trapping force associated with the FORT to adjust a sensitivity of the FORT accelerometer detection system.

7. The system of claim 1, wherein the FORT accelerometer detection system comprises an optical phase detection system configured to calculate the relative phase shift of the optical probe beam through the cluster of atoms based on motion of the cluster of atoms along the at least one axis from an approximate center point of the FORT.

8. The system of claim 1, wherein the interrogation system comprises an optical cavity configured to resonate the optical probe beam.

9. The system of claim 1, wherein the FORT comprises a pair of oppositely-disposed concave minors configured to resonate the optical trapping beam in a manner to substantially converge the optical trapping beam at an approximate center of the FORT to trap the cluster of atoms at the approximate center of the FORT.

10. The system of claim 8, wherein the cluster of atoms comprises a cluster of alkali metal atoms, and wherein the optical trapping beam is configured as one of a red and blue-detuned laser beam having a sufficiently narrow beam-waist and sufficient power for trapping the cluster of alkali metal atoms in the FORT.

11. A method for measuring an external acceleration in a Far-Off Resonance Trap (FORT) accelerometer system, the method comprising:
    generating an optical trapping beam;
    providing the optical trapping beam in a FORT to resonate the optical trapping beam in the FORT to trap a cluster of atoms at an approximate center of the FORT;
    providing an optical probe beam through the approximate center of the FORT orthogonally with respect to a sensitive axis of the FORT accelerometer system;
    monitoring a phase of the optical probe beam passing through the cluster of atoms; and
    calculating an external acceleration along the sensitive axis of the FORT accelerometer system based on a relative phase shift of an optical probe beam through the cluster of atoms resulting from motion of the cluster of atoms along the sensitive axis in response to the external acceleration.

12. The method of claim 11, wherein providing the optical trapping beam in the FORT comprises providing a plurality of optical trapping beams in a respective plurality of orthogonal optical cavities, wherein providing the optical probe beam through the approximate center of the FORT comprises providing a plurality of optical probe beams through an approximate center of the respective plurality of orthogonal optical cavities, and wherein calculating the external acceleration comprises calculating the external acceleration along each orthogonal axis of the FORT accelerometer system based on a relative phase shift of the plurality of optical probe beams through the respective cluster of atoms.

13. The method of claim 12, wherein providing the plurality of optical trapping beams in a respective plurality of orthogonal optical cavities comprises providing the plurality of optical trapping beams in orthogonal directions through a single cluster of atoms.

14. The method of claim 11, further comprising controlling an intensity of the optical trapping beam to adjust a magnitude of a trapping force associated with the FORT to adjust a sensitivity of the FORT accelerometer system.

15. The method of claim 11, wherein providing the optical trapping beam in the FORT comprises providing the optical trapping beam in the FORT comprising a pair of oppositely-disposed concave mirrors configured to resonate the optical trapping beam in a manner to substantially converge the optical trapping beam at the approximate center of the FORT to trap the cluster of atoms at the approximate center of the FORT.

16. The method of claim 11, wherein providing the optical probe beam through the approximate center of the optical cavity comprises providing the optical probe beam in an optical cavity through the approximate center of the FORT orthogonally with respect to the sensitive axis of the FORT accelerometer system.

17. An accelerometer system comprising:
   a Far-Off Resonance Trap (FORT) control system configured to generate at least one optical trapping beam;
   a FORT accelerometer detection system comprising:
      a FORT configured to trap at least one cluster of alkali atoms based on the at least one optical trapping beam; and
      an interrogation system comprising a plurality of orthogonal FORTs configured to resonate the at least one optical trapping beam in a respective plurality of orthogonal axes and being configured to determine motion of the at least one cluster of alkali atoms in each of the plurality of orthogonal axes resulting from an external acceleration based on a relative phase shift of a respective plurality of optical probe beams resonating through the at least one cluster of alkali atoms; and
   an acceleration processor configured to calculate the external acceleration in the at least one axis based on the relative phase shift of the optical probe beam.

18. The system of claim 17, wherein each of the at least one orthogonal trapping beam is provided as having approximately equal energy to trap the respective at least one cluster of alkali atoms with approximately equal force in each of the plurality of orthogonal axes.

19. The system of claim 17, wherein each of the plurality of orthogonal FORTs are configured to trap a respective one of a plurality of clusters of alkali atoms, such that the interrogation system is configured to determine motion of each of the plurality of clusters of alkali atoms in each of the respective plurality of orthogonal axes based on a relative phase shift of the respective plurality of optical probe beams through the respective pluralities of clusters of alkali atoms.

20. The system of claim 17, wherein the plurality of orthogonal FORTs are arranged as a three-axis resonator cavity configured to trap a single cluster of alkali atoms based on three respective orthogonal trapping beams, such that the interrogation system is configured to determine motion of the cluster of atoms resulting from the external acceleration in three orthogonal axes based on a relative phase shift of three orthogonal optical probe beams through the single cluster of alkali atoms.

* * * * *

UNITED STATES PATENT AND TRADEMARK OFFICE
CERTIFICATE OF CORRECTION

PATENT NO. : 9,234,912 B2  
APPLICATION NO. : 13/907250  
DATED : January 12, 2016  
INVENTOR(S) : Thad G. Walker et al.

Page 1 of 1

It is certified that error appears in the above-identified patent and that said Letters Patent is hereby corrected as shown below:

Claims
Column 10, line 5, claim 9 reads "concave minors" should read -- concave mirrors --

Signed and Sealed this
Twenty-sixth Day of April, 2016

Michelle K. Lee
*Director of the United States Patent and Trademark Office*